A. CAMPBELL.
DUMP CAR.
APPLICATION FILED JAN. 18, 1909.

937,418.

Patented Oct. 19, 1909.
3 SHEETS—SHEET 2.

Witnesses:
H. W. Munday
Esther Abrams

Inventor:
Argyle Campbell
By Munday, Evarts, Adcock & Clarke
Attorneys

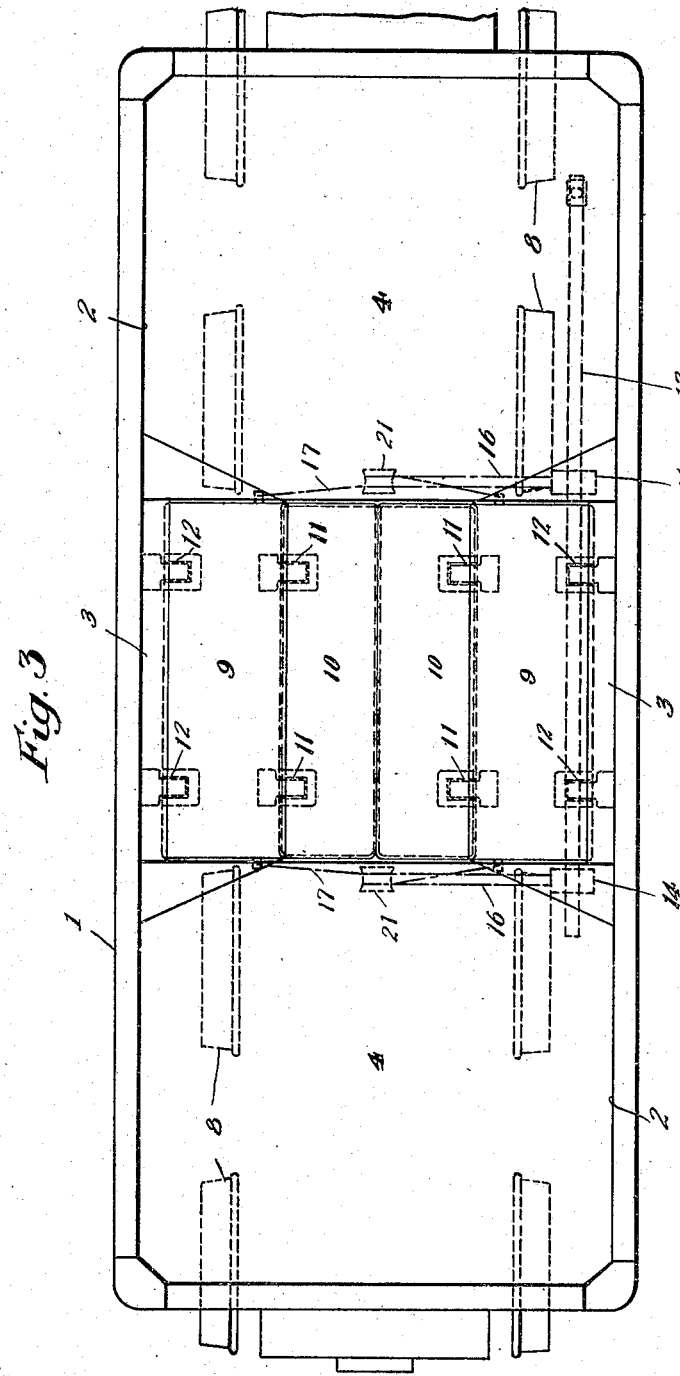

UNITED STATES PATENT OFFICE.

ARGYLE CAMPBELL, OF CHICAGO, ILLINOIS, ASSIGNOR TO ENTERPRISE RAILWAY EQUIPMENT COMPANY, OF CHICAGO, ILLINOIS, A CORPORATION OF ILLINOIS.

DUMP-CAR.

937,418.  Specification of Letters Patent.  Patented Oct. 19, 1909.

Application filed January 18, 1909. Serial No. 472,786.

*To all whom it may concern:*

Be it known that I, ARGYLE CAMPBELL, a citizen of the United States, residing in Chicago, in the county of Cook and State of Illinois, have invented a new and useful Improvement in Dump-Cars, of which the following is a specification.

The object of my invention is to provide an improved construction of dump car in which the door opening may be wider than the clear space between the car wheels on opposite sides of the car.

My invention consists in the means I employ to practically accomplish this object or result. That is to say, it consists in connection with a dump car body having an opening wider than the clear space between the car wheels from side to side, of two side doors hinged at their longitudinal outer edges adjacent to the longitudinal side edges of the opening and provided each with an inner door hinged at its outer longitudinal edge to the inner longitudinal edge of the side door so that the two inner doors may turn or swing in respect to the two side doors.

My invention further consists in the novel construction of parts and devices and in the novel combinations of parts and devices herein shown and described, and more particularly specified in the claims.

Figure 1:
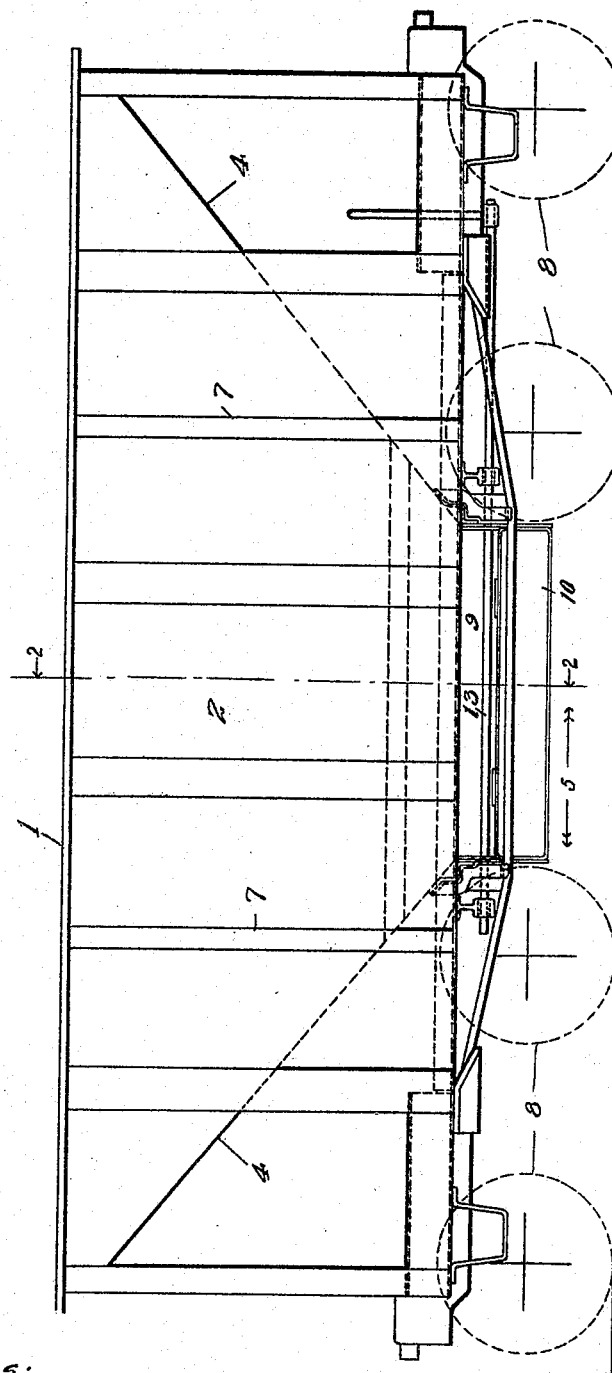
Figure 2:
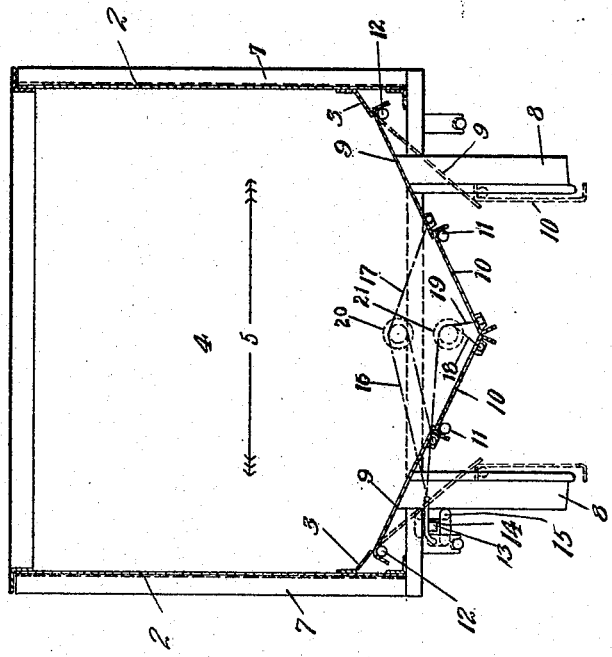

In the accompanying drawing forming a part of this specification, Figure 1 is a side elevation of a dump car embodying my invention. Fig. 2 is a vertical cross section on line 2—2 of Fig. 1 and Fig. 3 is a plan view.

In the drawing, 1 represents a dump car having a body 2, with inclined sides 3 and inclined ends 4, and a large central dump or discharge opening 5 which extends in width nearly to the upright sides 7 of the car, being thus much greater in width than the clear space between the car wheels 8 on opposite sides of the car. The door or discharge opening 5 is preferably less than the clear space between the car wheels longitudinally. Hinged at or near the longitudinal outer edge of the discharge opening of the dump car on each side of said opening is a longitudinally hinged side door 9. Each of the longitudinally hinged side doors 9 is furnished with an inner longitudinally hinged door 10, which is hinged at 11 directly to the side door 9 at its inner longitudinal edge. The two inner doors 10, 10, in connection with the two side doors 9, 9, close the discharge opening of the dump car, the two inner doors 10, 10 meeting together at their inner or lower edges. The two longitudinally hinged side doors 9 are hinged to the body of the car at 12. The side doors 9, 9 with their inner doors 10, 10 hinged thereto may be simultaneously opened and closed by any suitable door operating mechanism, the same preferably comprising an operating shaft 13, a polygonal winding drum 14 thereon and connecting links 15 adapted to wind around said polygonal drum, and connecting chains 16, 17, 18, 19 extending over pulleys 20, 21.

The main or side doors 9, 9 in connection with the inner of supplemental doors 10, 10 each hinged to one of said main doors constitute a flexible closure for the discharge opening of the dump car.

I claim:—

1. In a dump car, the combination with a dump car body, having a discharge opening of greater width than the clear space transversely between the car wheels from side to side, of two longitudinally hinged side doors each having an inner door hinged directly thereto at its longitudinal inner edge, substantially as specified.

2. In a dump car, the combination with a dump car body, having a discharge opening of greater width than the clear space transversely between the car wheels from side to side, of two longitudinally hinged side doors each having an inner door hinged directly thereto at its longitudinal inner edge, and mechanism for opening and closing said doors, comprising an operating shaft, winding drum and connections extending from said drum to the inner edges of the side doors and to the inner edges of the inner doors carried by said side doors, substantially as specified.

3. In a dump car, the combination with a dump car body having a discharge opening greater in extent than the clear space between the car wheels, and a pair of doors hinged at their outer edges adjacent to the parallel sides of said discharge opening and each provided with a supplemental door hinged thereto at its inner edge, substantially as specified.

4. In a dump car, a pair of inwardly extending doors together adapted to partially close the discharge opening, and each carrying an inwardly extending supplemental door hinged thereto, said supplemental doors closing the remaining portion of said discharge opening, substantially as specified.

5. In a dump car, the combination with an inwardly extending main door adapted to partially close a discharge opening, and an inwardly extending supplemental door carried thereby and hinged thereto at its inner edge, substantially as specified.

6. In a dump car, the combination with a main door adapted to partially close a discharge opening, and a supplemental door carried thereby and hinged thereto at its inner edge, and an operating shaft, winding drum and connections from said drum extending to the inner edge of the main door and to the inner edge of the supplemental door carried by said main door, substantially as specified.

7. In a dump car, the combination with a car body having a discharge opening, of two inwardly extending main doors hinged to the car body and partially closing said opening, each of said main doors being provided with an inwardly extending supplemental member flexibly connected thereto for closing the remaining portion of said discharge opening, substantially as specified.

8. In a dump car, the combination with a car body having a discharge opening, of an inwardly extending main door hinged to the body and partially closing said opening, and provided with an inwardly extending supplemental member flexibly connected thereto for closing a further portion of said opening, substantially as specified.

9. In a dump car, the combination with a car body having a discharge opening, of a flexible closure for said opening comprising an inwardly extending main door hinged to the frame and an inwardly extending supplemental member hinged to said main door, substantially as specified.

ARGYLE CAMPBELL.

Witnesses:
H. M. MUNDAY,
ESTHER ABRAMS.